US010795704B2

(12) United States Patent
Douglas

(10) Patent No.: US 10,795,704 B2
(45) Date of Patent: Oct. 6, 2020

(54) SERIALIZATION OF OBJECTS TO JAVA BYTECODE

(71) Applicant: Red Hat, Inc., Raleigh, NC (US)

(72) Inventor: Stuart Wade Douglas, Orange (AU)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/289,876

(22) Filed: Mar. 1, 2019

(65) Prior Publication Data

US 2020/0278876 A1 Sep. 3, 2020

(51) Int. Cl.
*G06F 9/455* (2018.01)
*G06F 16/901* (2019.01)
*G06F 8/30* (2018.01)

(52) U.S. Cl.
CPC .......... *G06F 9/45504* (2013.01); *G06F 8/315* (2013.01); *G06F 16/901* (2019.01)

(58) Field of Classification Search
CPC ... G06F 8/41; G06F 8/315; G06F 8/24; G06F 8/443; G06F 9/45504; G06F 16/901
USPC .................................................. 717/100–148
See application file for complete search history.

(56) References Cited

U.S. PATENT DOCUMENTS

| | | | | |
|---|---|---|---|---|
| 6,295,643 B1* | 9/2001 | Brown | .................. | G06F 9/4488 717/148 |
| 7,584,462 B2* | 9/2009 | Wolff | ...................... | G06F 9/445 717/140 |
| 9,122,491 B2* | 9/2015 | Chan | .......................... | G06F 9/54 |
| 2004/0193616 A1* | 9/2004 | Pharies | ...................... | G06F 8/51 |
| 2005/0071809 A1* | 3/2005 | Pulley | ................... | G06F 9/4488 717/108 |
| 2005/0097110 A1* | 5/2005 | Nishanov | ............... | G06F 16/258 |
| 2005/0114871 A1* | 5/2005 | Wolff | ...................... | G06F 9/445 719/331 |
| 2005/0154978 A1* | 7/2005 | Albornoz | .............. | G06F 17/218 715/237 |

OTHER PUBLICATIONS

Michael Armbrust, Wenchen Fan, Reynold Xin and Matei Zaharia; "Introducing Apache Spark Datasets"; The Databricks Blog; https://databricks.com/blog/2016/01/04/introducing-apache-spark-datasets.html; Published Jan. 4, 2016; retrieved on Dec. 20, 2018 (9 Pages).
Andreas Schaefer; "What is a serialized bean?"; http://www.jguru.com/faq/view.jsp?EID=100726; retrieved on Dec. 21, 2018; (3 Pages).

* cited by examiner

*Primary Examiner* — Marina Lee
(74) *Attorney, Agent, or Firm* — K&L Gates LLP

(57) ABSTRACT

A system includes a memory, a processor in communication with the memory, and a serializer. The serializer is configured to receive an object that includes at least one field, initiate serialization of the object according to a rule set, and write a first intermediate representation of a new object based on the object. The serializer is also configured to write a second intermediate representation to set the at least one field in the new object. Additionally, the serializer is configured to output a serialization of the new object based on the first intermediate representation and the second intermediate representation.

20 Claims, 7 Drawing Sheets

SERIALIZATION OF OBJECTS TO JAVA BYTECODE

BACKGROUND

Computer systems may run applications or services that are provided via a server or cloud. The applications or services can be developed and deployed at runtime. Application instances or services may run within containers, which may be run on physical or virtual machines. For example, containers may encapsulate a runtime environment for an application instance or service. Application instances may be started or replicated across nodes and each application instance may require configuration objects (e.g., lists, collections, arrays, etc. used for configuration), classes, artifacts, dependencies, annotations, libraries, etc. to be loaded at various times (e.g., configuration, runtime or deployment).

SUMMARY

The present disclosure provides new and innovative systems and methods for serialization of objects to bytecode. In an example, a system includes a memory, a processor in communication with the memory, and a serializer. The serializer is configured to receive an object that includes at least one field, initiate serialization of the object according to a rule set, and write a first intermediate representation of a new object based on the object. The serializer is also configured to write a second intermediate representation to set the at least one field in the new object. Additionally, the serializer is configured to output a serialization of the new object based on the first intermediate representation and the second intermediate representation.

In an example, a method includes receiving an object that includes at least one field, initiating serialization of the object according to a rule set, and writing a first intermediate representation of a new object based on the object. The method also includes writing a second intermediate representation to set the at least one field in the new object, and outputting a serialization of the new object based on the first intermediate representation and the second intermediate representation.

In an example, a method includes receiving an object and serializing the object according to a rule set by writing a bytecode configured to create a new object. The rule set requires that properties of the object are mutable and the rule set defines a default constructor. The method also includes outputting the bytecode of the object and executing the bytecode output by the serializer to configure runtime services of at least one application.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
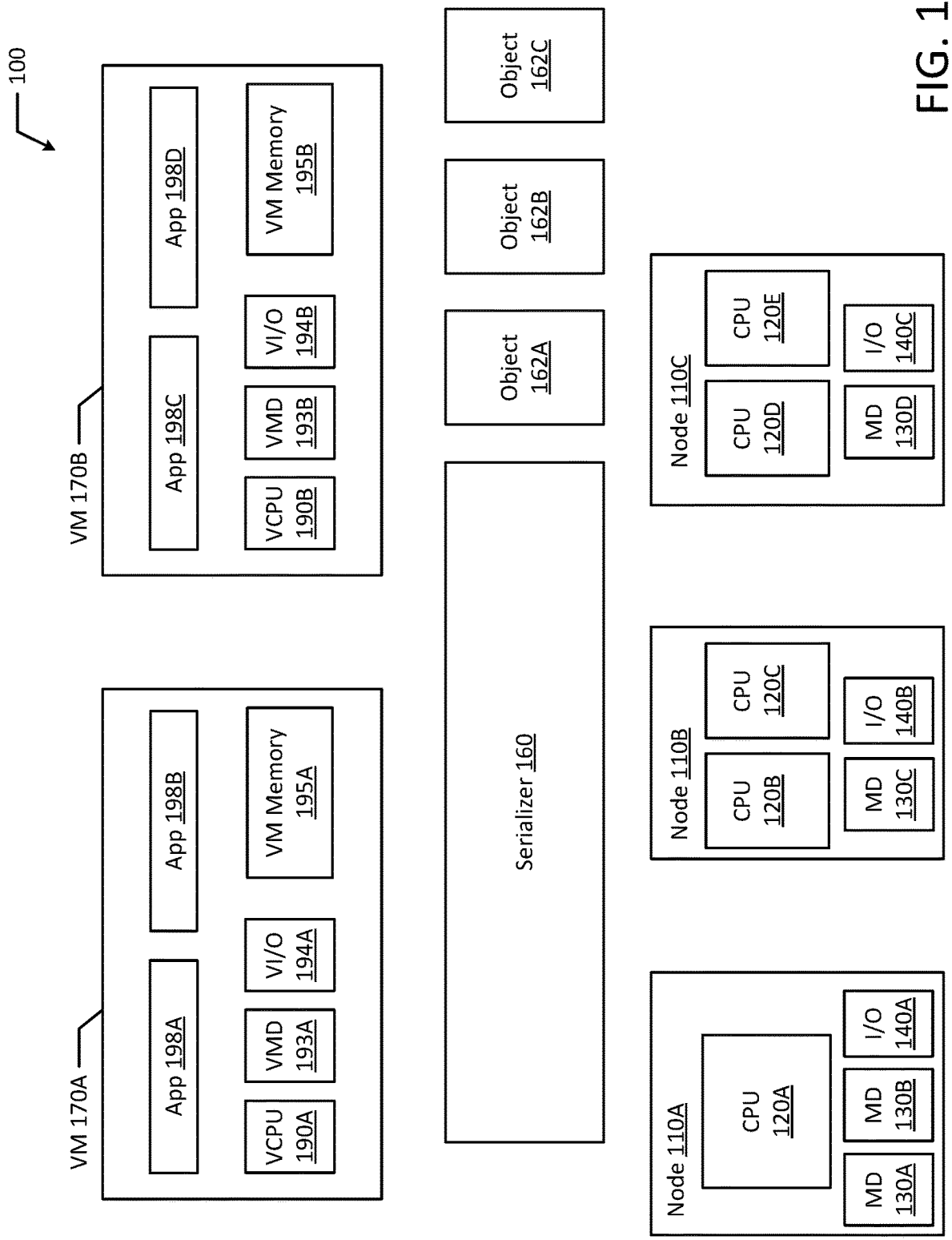
FIG. 1 illustrates a block diagram of an example computing system according to an example embodiment of the present disclosure.

Generating intermediate representations of objects, such as custom Java bytecode, at runtime is a complex process that involves writing out the bytecode directly using a bytecode generation library or by using a custom data format that has to be processed at application startup. Typically, writing out the bytecode directly using a bytecode generation library requires extensive knowledge of Java Virtual Machine ("JVM") internals. The complexity of generating bytecode typically makes such implementations difficult to integrate. For example, a security provider interface ("SPI") may require users to generate bytecode directly and thus may be too difficult for an average developer to easily work with.

Additionally, the details of an application configuration are typically known at build time. However, even though the configuration objects required to configure the deployment are present at build time, the configuration objects or files are still typically processed at runtime, which results in a slower startup and additional memory usage. For example, when an application is configured at runtime, eXtensible Markup Language ("XML") and annotations are parsed and then processed at runtime to configure the application. Parsing and processing the XML and annotations may involve loading several different classes, which increase the memory footprint of the application. The disadvantages associated with the slower startup times and additional memory usage are augmented when implementing application instances on a cloud. For example, hundreds to thousands of application instances may be deployed and started on the cloud, and each instance may incur these additional memory costs.

To automate and simplify the intermediate representation (e.g., bytecode) generation process and to conserve system resources at runtime, techniques are disclosed for serializing objects to intermediate representations (e.g., bytecode) by passing objects to a serializer (e.g., prior to runtime). The serializer follows a rule set that allow users (e.g., developers and programmers) to pass the objects to the serializer, which then outputs an intermediate representation (e.g., bytecode) that can be executed to recreate the object. Additionally, the intermediate representations may be generated at build time to reduce application startup time and runtime memory usage. Generating intermediate representation(s) (e.g., bytecode) prior to runtime (e.g., at build time) improves efficiency by allowing runtime services to start sooner and with a smaller runtime memory footprint. Specifically, by pre-generating the intermediate representation (e.g., bytecode) using a serializer, rather than using a custom data format that is processed at application startup, the intermediate representation may be directly executed at runtime to conserve system resources and reduce application startup time. Additionally, automatically serializing an object and generating bytecode with the serializer, rather than writing out the intermediate representation (e.g., bytecode) using a bytecode generation library, advantageously reduces the complexity and know-how required to generate the bytecode and makes bytecode implementations easier to integrate for less experiences users. By configuring and deploying applications using the objects recreated from the intermediate representation (bytecode), fewer resources are consumed when starting nodes and application instances by executing the intermediate representation.

The present disclosure is especially advantageous to cloud providers that want to optimize the efficiency of the cloud by reducing startup times and reducing memory usage. For example, configuration objects created from the bytecode may allow for almost instant startup times and require approximately one-fifth the memory of the JVM. Cloud providers like the Red Hat® Cloud Suite may utilize bytecode for application instances to reduce overhead. By pre-generating the bytecode and later executing the bytecode at runtime, the systems and methods disclosed herein consume less runtime memory because the resulting deployed application is smaller (i.e., contains less classes) than applications that are typically built at runtime.

The objects used to start or configure deployed application may be further optimized through dead code elimination. For example, unused or unusable code (e.g., dead code) may be eliminated and only services that are actually required by the current configuration will be invoked. In an example, tools such as GraalVM™ and/or Substrate VM may be used to perform ahead of time compilation to build a native image that provides dead code elimination. By using tools such as GraalVM™, Substrate VM and other dead code elimination techniques, additional code may be considered unused and eliminated, as only services that are actually required by the object used by the object for application configuration are then invoked. By eliminating unused or unusable code, a smaller image is generated that uses less memory at runtime. Specifically, if a framework has ten features, but a specific application instance will only use three of the features, dead code elimination tools may build a native executable file from the bytecode that only sets and serializes the necessary portions of the object, such that when the object is recreated to configure the application, the configuration includes only the three used features instead of each of the ten features of the framework. For some features, eliminating dead code may results in removal of large blocks of code that is unnecessary or unused when configuring the application. By further reducing the runtime overhead of applications (e.g., Java applications), the present disclosure may provide significant advantages in cloud environments.

FIG. 1 depicts a high-level component diagram of an example computing system 100 in accordance with one or more aspects of the present disclosure. The computing system 100 may include a serializer 160, objects 162A-C, one or more virtual machines (VM 170A-B), and nodes (e.g., nodes 110A-C).

Serializer 160 may output bytecode from objects passed to the serializer 160. For example, the serializer 160 may receive objects and may output a serialization of the object 162 by writing bytecode to create a "shell" or empty new object and then writing bytecode for the various elements of the object 162 or to set the fields of the "shell" or empty new object, such that the bytecode can be executed to recreate the object 162. For example, the serializer 160 may write different portions of bytecode that together may be executed to recreate the object 162. The serializer 160 may analyze the object 162 it receives and recursively write bytecode that first creates a "shell" or empty new object and then writes bytecode to establish the properties or set the fields of the empty new object such that it matches the original object 162. In an example, the serializer 160 may be a recorder, such as a recorder proxy or a recorder object that records invocations of proxy objects and generates an intermediate representation (e.g., Java bytecode) from the recorded sequence of invocations. The serializer 160 may be a program running on a processor (e.g., CPU 120A-E or VCPU 190A-B). For example, VCPU 190A and VCPU 190B may each have their own serializer 160 that runs on the processor.

The bytecode may be executed to recreate a serialized object, which may be used to start runtime services for various applications (e.g., Applications 198A-D). For example, the bytecode may recreate a serialized object to configure runtime services. Additionally, the bytecode may be translated into machine code for the virtual machines 170A-B at runtime. In an example, applications 198A-D may be different applications or services. In another example, applications 198A-D may be different instances of the same application or service.

Virtual machines 170A-B may include a virtual machine memory (VM Memory), a virtual CPU (VCPU), virtual memory devices (VMD), and virtual input/output devices (VI/O). For example, virtual machine 170A may include virtual machine memory 195A, a virtual CPU 190A, a virtual memory devices 192A, and a virtual input/output device 194A. Similarly, virtual machine 170B may include virtual machine memory 195B, a virtual CPU 190B, a virtual memory devices 192B, and virtual input/output device 194B.

In an example, a virtual machine 170A may execute a guest operating system and run applications 198A-B which may utilize the underlying VCPU 190A, VMD 192A, and VI/O device 194A. One or more applications 198A-B may be running on a virtual machine 170A under the respective guest operating system. A virtual machine (e.g., VM 170A-B, as illustrated in FIG. 1) may run on any type of dependent, independent, compatible, and/or incompatible applications on the underlying hardware and operating system ("OS"). In an example, applications (e.g., App 198A-B) run on a virtual machine 170A may be dependent on the underlying hardware and/or OS. In another example embodiment, applications 198A-B run on a virtual machine 170A may be independent of the underlying hardware and/or OS. For example, applications 198A-B run on a first virtual machine 170A may be dependent on the underlying hardware and/or OS while applications (e.g., application 198C-D) run on a second virtual machine (e.g., VM 170B) are independent of the underlying hardware and/or OS. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186.

In an example, virtual machines 170A-B may instead be containers that execute applications or services, such as microservices. In an example, the containers may each run a process or service and the containers may be executed in any execution environment. For example, the containers may operate as a virtual server. It should be appreciated that containers may be stand-alone execution environments, similar to that of a virtual machine. The applications 198A-D or services (e.g., microservices) may run in a software container or a virtual machine (e.g., virtual machines 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
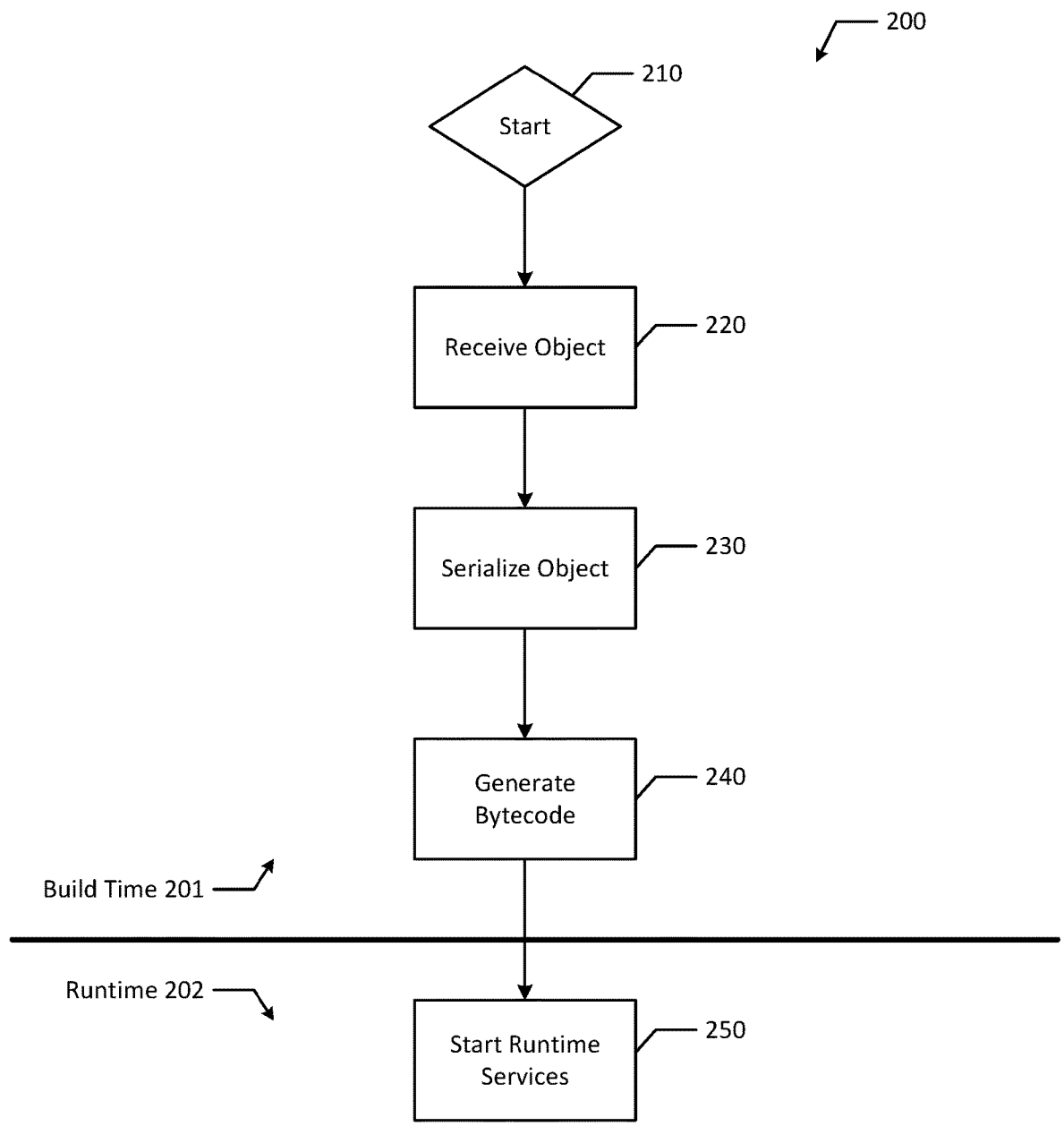
FIG. 2 illustrates a flowchart of an example process for generating bytecode for application deployment at build time according to an example embodiment of the present disclosure.

FIG. 2 illustrates a flowchart of an example method 200 for serialization of objects to bytecode for application deployment at build time. The bytecode may be executed to recreate the serialized object, which may be used for application deployment. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes starting an object build or an application build (block 210) prior to runtime 202 (e.g., at build time 201). Then, method 200 includes receiving an object(s) 162 (block 220) and serializing the object(s) (block 230). Then, bytecode is output or generated for the object(s) 162 (block 240) prior to runtime 202.

Then, at runtime 202, method 200 includes starting runtime services (block 250). For example, the bytecode may be executed to recreate the serialized object(s) 162, which may be used to start runtime services. The bytecode may be run directly, advantageously allowing runtime services to be started efficiently without having to generate or write out the bytecode directly at runtime 202. By pre-generating the bytecode using a serializer 160 (e.g., serializing object(s) 162), extensive knowledge of bytecode generation libraries or JVM internals is not necessary thereby allowing more users (e.g., developers or programmers) to implement and integrate the bytecode. Additionally, the bytecode described herein conserves system resources (e.g., runtime memory) and reduces startup times of applications 198 started from objects created using the bytecode. The memory savings become more substantial when starting nodes or application instances in cloud environments. For example, using an additional MB of memory at build time may not appear significant for a single application, but in cloud environments with thousands of nodes running application instances (where each would use an additional MB of runtime memory), the runtime memory savings is more pronounced.

For example, overhead reduction may be achieved for frameworks that would typically load parsers (e.g., XML parsers) having multiple configuration classes (e.g., thousands of classes) loaded at runtime even though those classes are not required to recreate objects used for runtime services. These configuration classes may then continue to hang around in the runtime environment resulting in a constant drain of runtime memory. Furthermore, additional overhead may be reduced by using a dead code elimination tool. For example, for frameworks that typically only use 50 percent of the functionality of the full framework, the overhead associated with the 50 percent of unused framework features may also be freed up.

Figure 3:
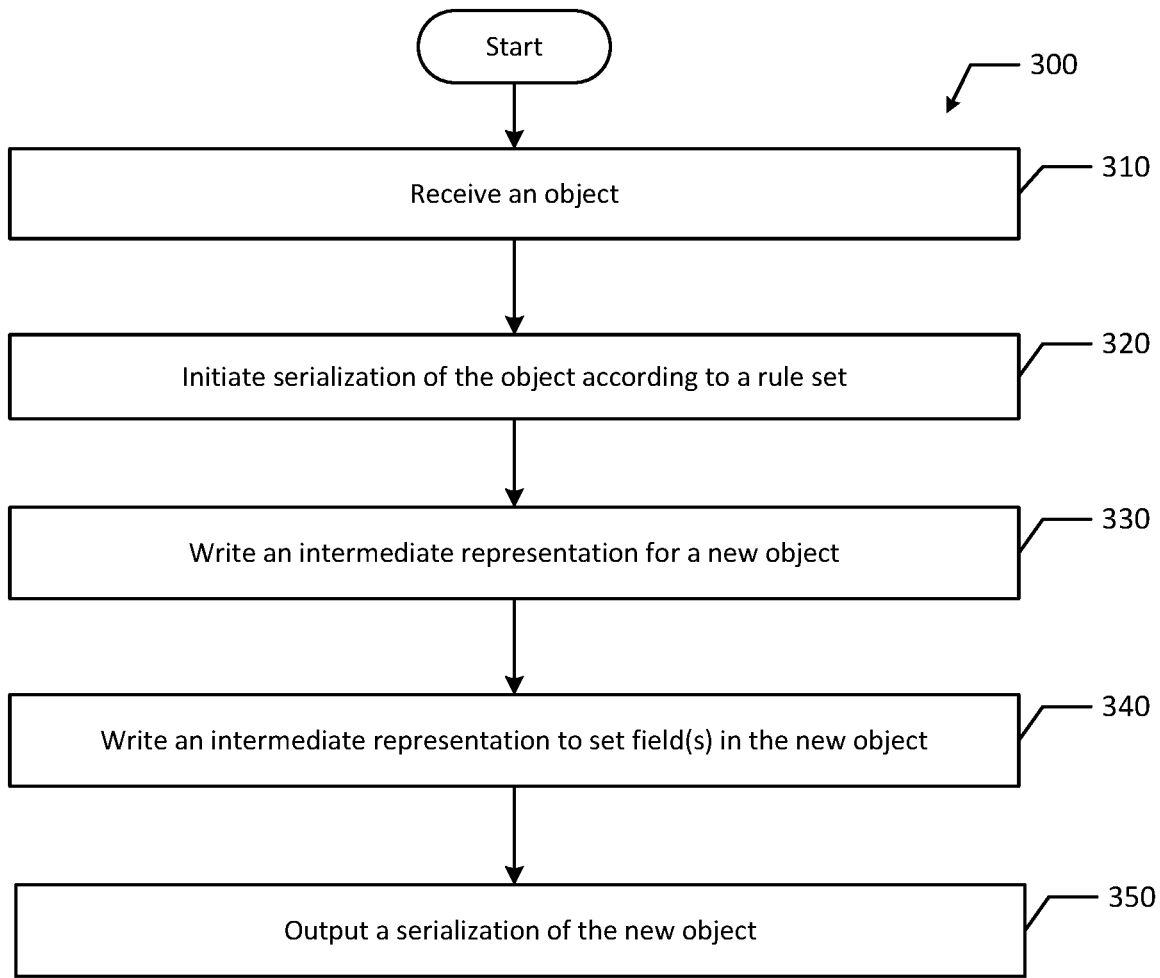
FIG. 3 illustrates a flowchart of an example process for serializing objects into intermediate representations according to an example embodiment of the present disclosure.

FIG. 3 illustrates a flowchart of an example method 300 for serialization of an object into intermediate representations. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

The example method 300 includes receiving an object (block 310). For example, a serializer 160 may receive an object 162. The object may be a representation of the configuration for runtime services, which may be passed to the serializer 160. In an example, the object 162 may include one or more fields. Then, method 300 includes initiating serialization of the object according to a rule set (block 320). For example, the serializer 160 may initiate serialization of the object 162 according to a rule set. The rule set may advantageously allow the serialization process to correctly encode and decode many different types of objects. For example, the rule set may require object classes to have a default constructor and may also require that the object properties are mutable. A default constructor may allow a user or developer to pass objects directly to the serializer 160 without having to pass any other additional parameters to the serializer 160. Additionally, requiring that the object properties are mutable ensures that the serializer 160 can write bytecode to modify each property (e.g., filed, element, etc.). Various rule sets may be implemented for serialization of objects 162 and classes that do not meet a certain specification or set of rules. For example, the JavaBean specification may define a set of rules to serialize one group of objects 162 or classes and another rule set may enable serialization of objects 162 and classes that do not meet the JavaBean specification. In an example, the rule set may be established or defined by a specification, for example, the JavaBean specification.

Additionally, method 300 includes writing an intermediate representation for a new object (block 330). For example, the serializer 160 may write an intermediate representation of a new object based on the object 162 the serializer 160 received. Then, method 300 includes writing an intermediate representation to set field(s) in the new object (block 340). For example, the serializer 160 may write an intermediate representation to set the field(s) in the new object. The object 162 may include multiple fields, and the serializer may write multiple sets of intermediate representations (e.g., bytecode) to set the fields of the new object. For example, for complex objects, the serialization process may be followed recursively.

As discussed above, some objects may include multiple fields, which may include their own objects. Additionally, some objects 162 may include several elements. In some cases, the serializer 160 may write multiple sets of bytecode to create the new object with the appropriate fields or elements. For example, the object may be a list, an array, a collection, etc.

Method 300 also includes outputting a serialization of the new object (block 350). For example, the serializer 160 may output a serialization of the new object based on the intermediate representations written by the serializer 160. In an example, the serialization itself may be an intermediate representation, which is executable to recreate the object 162. The intermediate representation may be bytecode, such as JVM bytecode. The bytecode (e.g., JVM bytecode) may also be referred to as portable code or p-code. The bytecode is a form of instruction set designed for efficient execution by a software interpreter, and the bytecode is a compact numeric code that encodes the result of passing the object 162 to the serializer 160. It should be appreciated that other forms of bytecode or native executable files may be generated. For example, common language runtime ("CLR") bytecode, common intermediate language ("CIL") bytecode or other executable codes may be generated all of which may be referred to as intermediate representations. By outputting the bytecode prior to runtime (e.g., pre-generating the bytecode), application instances or runtime services may advantageously be started efficiently without directly writing out or generating bytecode at runtime, which saves time and reduces the instant memory consumption of the application instance and reduces the memory footprint of the application during the applications life.

Figure 4:
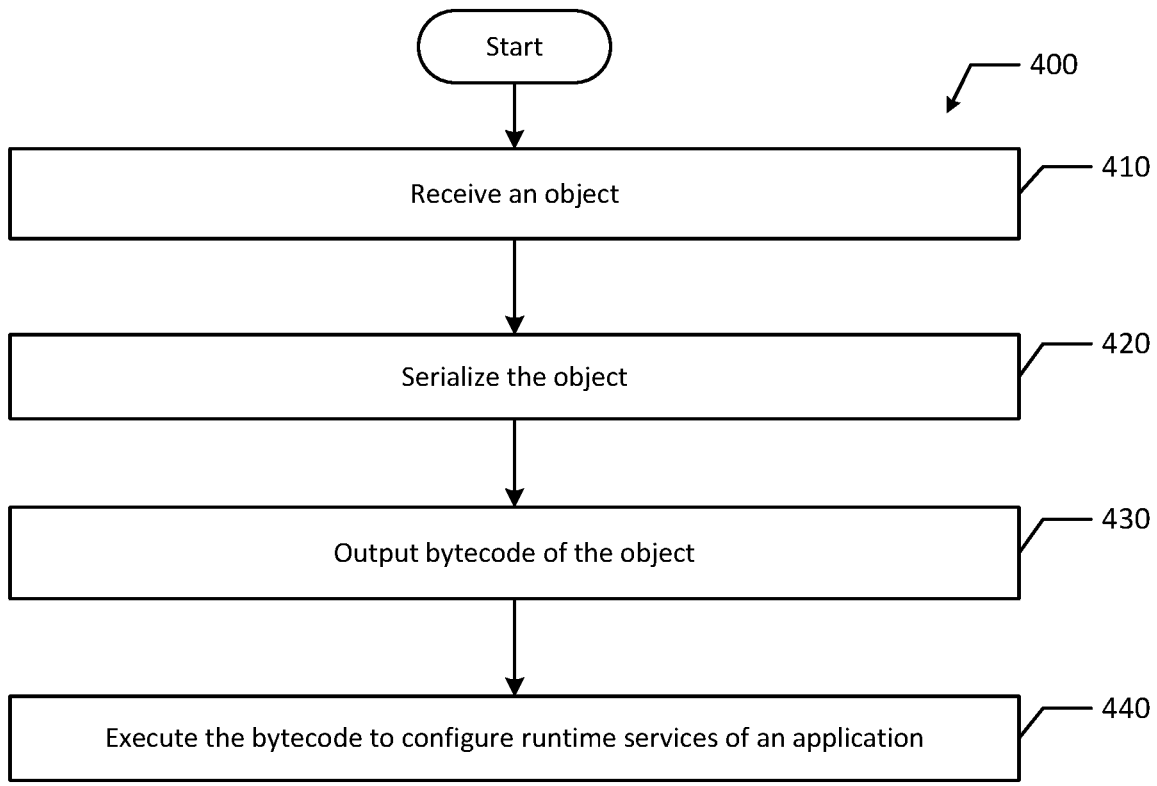
FIG. 4 illustrates a flowchart of an example process for serializing objects into bytecode and executing the bytecode according to an example embodiment of the present disclosure.

FIG. 4 illustrates a flowchart of an example method 400 for serializing objects into bytecode and executing the bytecode (e.g., configuring application deployment by executing the bytecode). Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

The example method 400 includes receiving an object (block 410). For example, a serializer 160 may receive an object 162. The object may be a representation of the configuration for runtime services, which may be passed to the serializer 160. Then, method 400 includes serializing the object (block 420). The object 162 may be serialized by writing an intermediate representation or bytecode to create the new object and then to set the properties of the object (e.g., set the fields, create additional elements of the object, etc.). In an example, complex objects 162 may be serialized by following a recursive process. For example, lists, arrays and other collections may be serialized by processing each element in the collection individually and then generating bytecode to call the relevant methods to add the items to the collection. In some examples, an object 162 may have tens or hundreds of fields.

In one example of a class with a "name" field with a value of "Anonymous", the serializer 160 may write bytecode to create a new instance of the class and may write bytecode to create a new label. Then, the serializer 160 may write bytecode to set the "name" field in the new instance to be "Anonymous". In another example, a "square" class may include four point objects. The serializer 160 may write bytecode for each point object and then may write bytecode for "square". Then, the serializer 160 may write bytecode to set each of the point objects in the fields of "square".

Additionally, method 400 includes outputting bytecode of the object (block 430). For example, the serializer 160 may output bytecode of the object 162. Then, method 400 includes executing the bytecode to configure runtime services of an application (block 440). For example, a virtual machine 170 may execute the bytecode to recreate a serialized object 162, which may be used to start runtime services for various applications (e.g., Applications 198A-D). For example, the bytecode may recreate a serialized object to configure runtime services. Accordingly, the disclosed method is user friendly and results in executing the bytecode to generate objects 162, which may be used for application startup. The bytecode uses less runtime memory, provides increased startup efficiency, and reduces overall application deployment resource requirements.

The virtual machine (e.g., VM 170A-B) that executes the bytecode may be the same virtual machine (e.g., VM 170A) that generated the bytecode. In another example, the virtual machine (e.g., VM 170B) that executes the bytecode may be different from the virtual machine (e.g., VM 170A) that generated the bytecode. Similarly, the virtual machine that creates the serializer 160 may be the same virtual machine or different virtual machine that executes the serializer 160 (e.g., passes objects to the serializer 160). Furthermore, the virtual machine that creates and/or executes the serializer 160 may be the same virtual machine or a different virtual machine that generates and/or executes the bytecode. Additionally, different virtual machine instances or different virtual machines may generate and execute the bytecode. The different virtual machine instances or different virtual machines may be on the same node (e.g., computer or machine) or on different nodes (e.g., computers or machines).

Figure 5A:
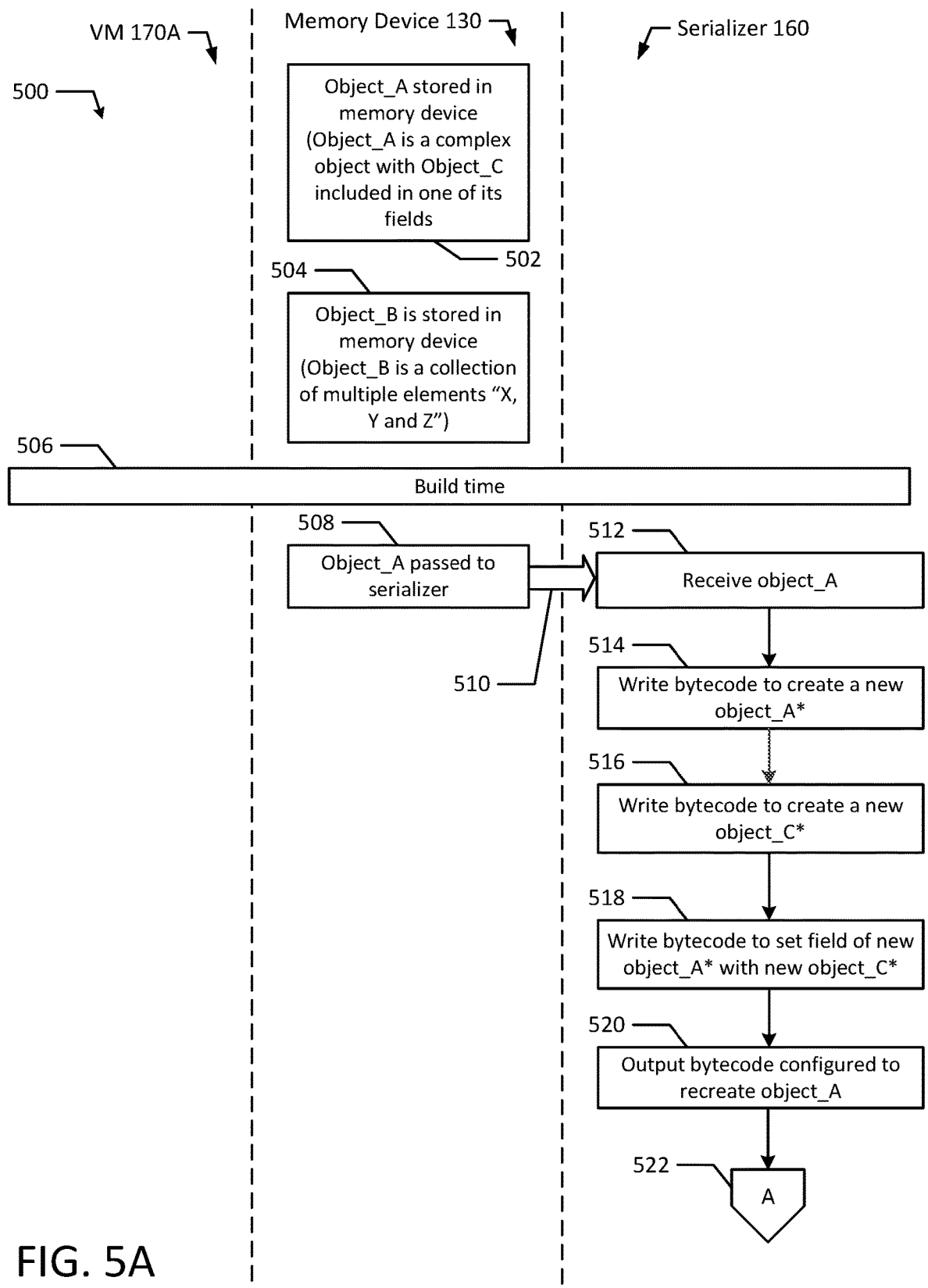
FIGS. 5A and 5B illustrate a flow diagram of an example process for object serialization and application deployment using reduced overhead bytecode according to an example embodiment of the present disclosure.
Figure 5B:
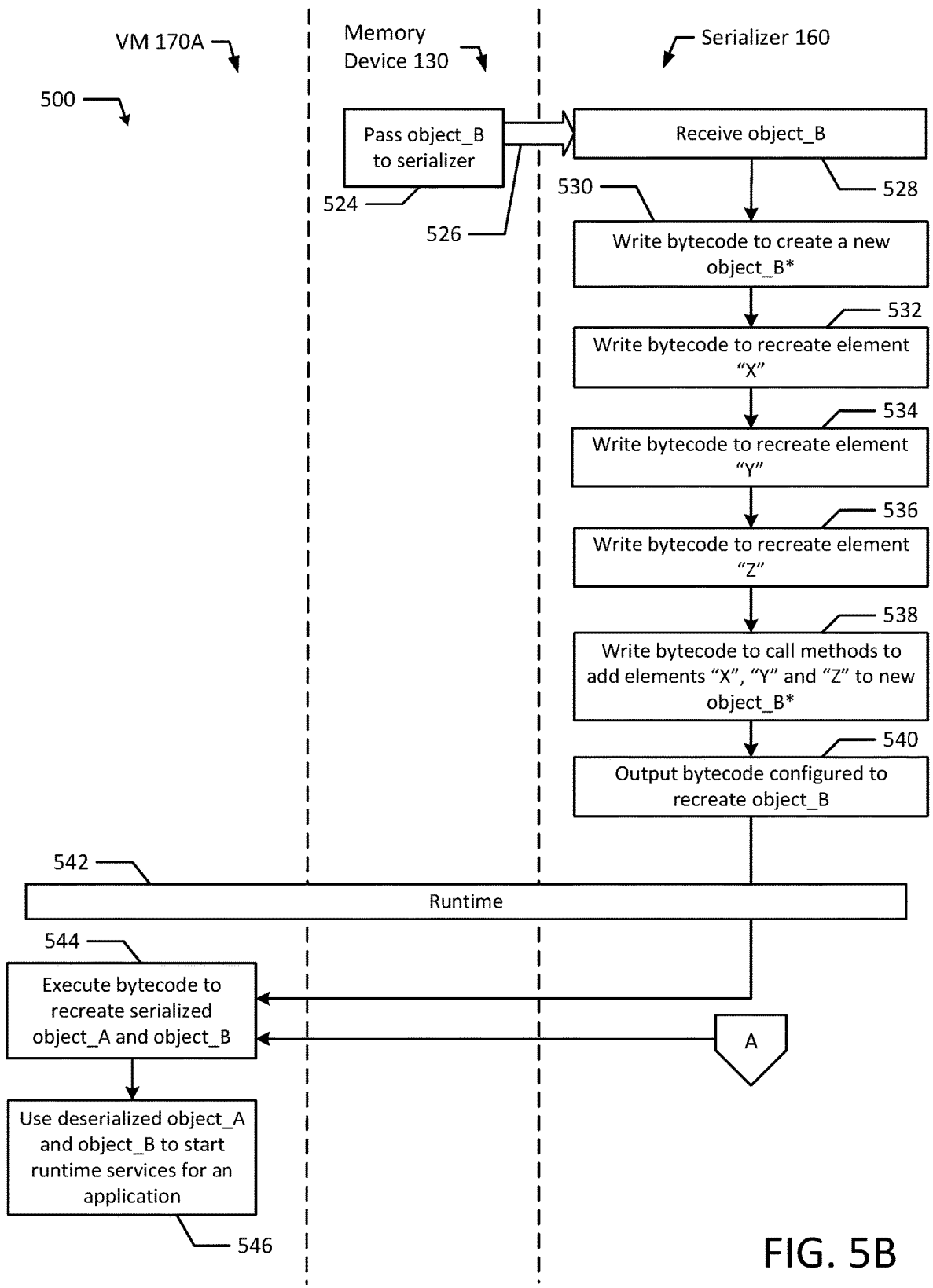

FIGS. 5A and 5B illustrate a flowchart of an example method 500 for object serialization and application deployment in accordance with an example embodiment of the present disclosure. Although the example method 500 is described with reference to the flowchart illustrated in FIGS. 5A and 5B it will be appreciated that many other methods of performing the acts associated with the method 500 may be used. For example, the order of some of the blocks may be changed, certain blocks may be combined with other blocks, blocks may be repeated, and some of the blocks described are optional. For example, a serializer 160, memory device 130 and virtual machine 170A may communicate with objects 162 (e.g., Object_A, Object_B and Object_C) to perform example method 500.

In the illustrated example, a real object (e.g., Object_A) is a complex object stored in memory with fields including Object_C in one of its fields (block 502). Additionally, Object_B is stored in memory and is a collection of multiple elements (e.g., elements "Y", "Y" and "Z") (block 504). In an example, Object_A and Object_B may be runtime service configurations that are built into objects that represent the configuration.

At build time (block 506), a user may pass Object_A to the serializer 160 (blocks 508 and 510). For example, Object_A may be passed to the serializer 160 from in memory so that it can be recorded to bytecode. Then, the serializer 160 receives Object_A (block 512) and writes bytecode to create a new Object_A* (block 514). For example, the bytecode may written to create a "shell" or empty new Object_A* that does not have all of its properties or fields set yet. Then, the serializer 160 writes bytecode to create a new Object_C* (block 516). In the illustrated example, Object_A is a complex object with a field that Object_C. By creating the "shell" for Object_A, the serializer 160 may recursively process each element of the complex object and write bytecode for each element. Then, the serializer 160 writes bytecode to set the field of new Object_A* with the new Object_C* (block 518). For example, bytecode may be written for each part of the complex object and may also be written to compile or arrange the elements of the object (e.g., set the field values of the object). After writing the bytecode to set the field of new Object_A* with Object_C*, the serializer 160 outputs the bytecode, which is configured recreate Object_A (block 520). The output bytecode may be saved for later use (e.g., as indicated by reference block 522).

Continuing on FIG. 5B, a user may pass Object_B to the serializer 160 (blocks 524 and 526). For example, Object_B may be passed to the serializer 160 from in memory so that it can be recorded to bytecode. Then, the serializer 160 receives Object_B (block 528) and writes bytecode to create a new Object_B* (block 530). For example, the bytecode may written to create a "shell" or empty new Object_B* that does not have all of its properties or fields set yet. Then, the serializer 160 writes bytecode to recreate element "X" (block 532), element "Y" (block 534), and element "Z" (block 536). In the illustrated example, Object_B has multiple elements. By creating the "shell" for Object_B, the serializer 160 may recursively process each element and write bytecode for each element "X", "Y" and "Z". Then, the serializer 160 writes bytecode to call methods to add elements "X", "Y" and "Z" to the new Object_B* (block 540). For example, bytecode may be written for each element and may also be written to call methods to compile or arrange the elements of the object. After writing the bytecode to assemble the elements of Object_B*, the serializer 160 outputs the bytecode, which is configured recreate Object_B (block 540).

Automating and simplifying the bytecode generation process allows for implementing pre-generated bytecode at build time instead of runtime for various systems and SPIs. Additionally, applications started or configured with configuration objects created by executing the bytecode may save time and reduce the instant memory consumption of the application instance (e.g., Java middleware) thereby reducing the memory footprint of the application (e.g., Java middleware) during the applications life.

Once the bytecode is generated, the bytecode may be used to create objects used to start or configure runtime services for several application instances on the cloud on the same virtual machine or different virtual machines. In the illustrated example, the bytecode is pre-generated prior to runtime. For example, the bytecode may be generated well before any application instances are started on the cloud. Then, at runtime (block 542), virtual machine 170A may execute the bytecode to recreate serialized Object_A and Object_B (block 544). For example, to recreate the objects, the virtual machine 170A may execute the bytecode directly. Then, the virtual machine may use the objects (e.g., Object_A and Object_B) to start runtime services for the application (block 546). In an example, the same bytecode may be used to generate other instances of the objects (e.g., Object_A and Object_B) to configure other instances of the application. In the illustrated example, other virtual machines (e.g., virtual machine 170B) may also execute the same bytecode. For example, to start another instance of the application, the virtual machine 170B may execute the previously generated bytecode directly. The resulting deployed application instances may be smaller than an application instance started using traditional approaches. By reducing runtime overhead of applications (e.g., Java applications), the memory footprint and memory consumption is advantageously reduced which provides performance and cost advantages, specifically in cloud environments.

Figure 6:
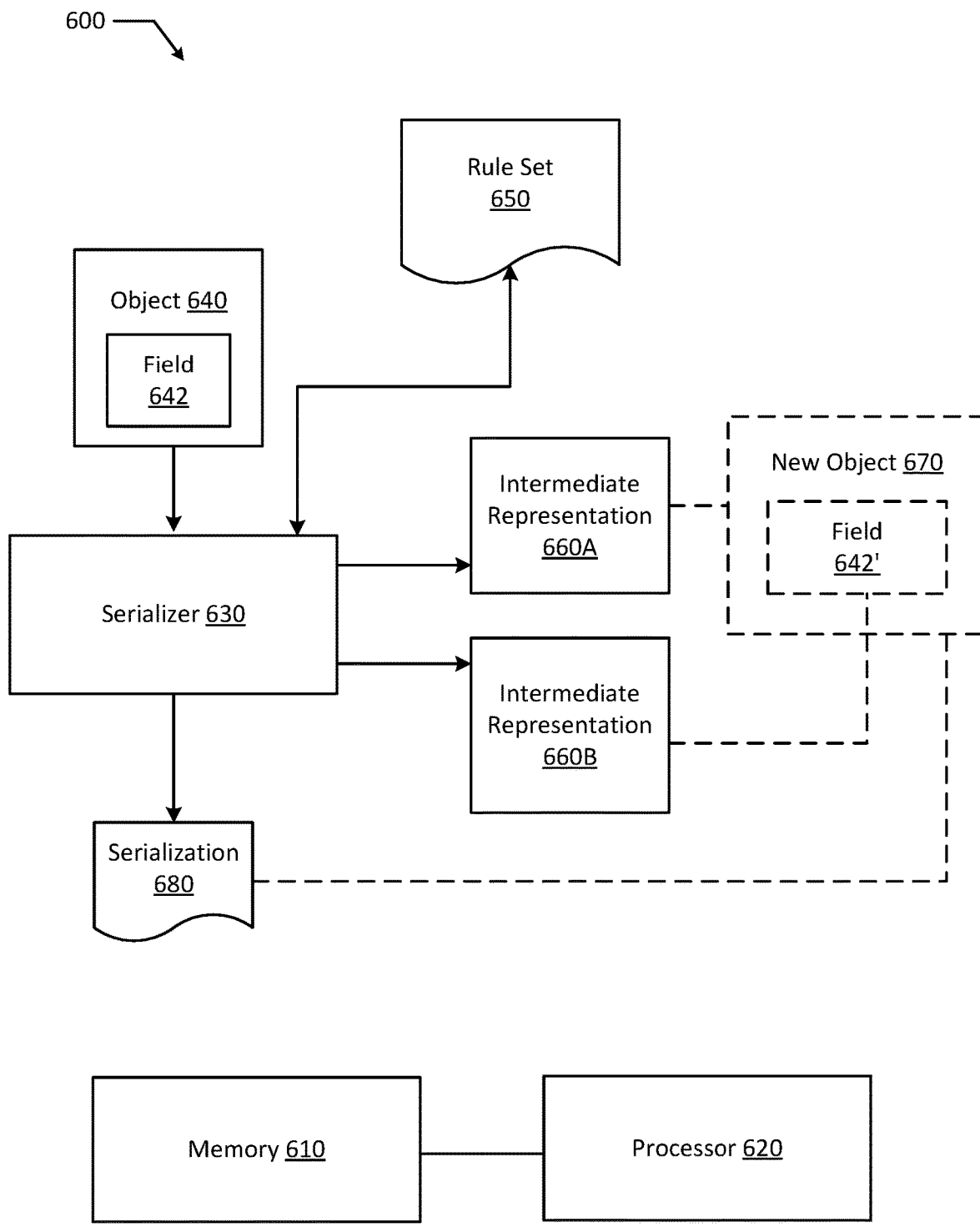
FIG. 6 illustrates a block diagram of an example serialization system according to an example embodiment of the present disclosure.

FIG. 6 is a block diagram of an example serialization system 600 according to an example embodiment of the present disclosure. The bytecode generation system 600 includes a memory 610, a processor 620 in communication with the memory 610, and a serializer 630. The serializer 630 is configured to receive an object 640 that includes at least one field 642, initiate serialization of the object 640 according to a rule set 650, and write a first intermediate representation 660A of a new object 670 based on the object 640. The serializer 630 is also configured to write a second intermediate representation 660B to set the at least one field 642 (e.g., field 642' in the new object 670). Additionally, the serializer 630 is configured to output a serialization 680 of the new object 670 based on the first intermediate representation 660A and the second intermediate representation 660B.

By generating the intermediate representations 660A-B and outputting a serialization of the new object 670 (e.g., bytecode), a user (e.g., developer or programmer) may automatically generate bytecode for objects 640 using a serializer, instead of directly writing out bytecode using a bytecode generation library, which may require extensive knowledge of virtual machine internals or coding expertise. Accordingly, the disclosed system is user friendly and results in executing the bytecode to generate objects, which may be used for application startup. The bytecode uses less runtime memory, provides increased startup efficiency, and reduces overall application deployment resource requirements.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory, a processor in communication with the memory, and a serializer. The serializer is configured to receive an object that includes at least one field, initiate serialization of the object according to a rule set, and write a first intermediate representation of a new object based on the object. The serializer is also configured to write a second intermediate representation to set the at least one field in the new object. Additionally, the serializer is configured to output a serialization of the new object based on the first intermediate representation and the second intermediate representation.

In a 2nd exemplary aspect of the present disclosure, which may be used in combination with any one or more of the preceding aspects (e.g., the 1st aspect), the intermediate representation is bytecode.

In a 3rd exemplary aspect of the present disclosure, which may be used in combination with any one or more of the preceding aspects (e.g., the 2nd aspect), the bytecode is Java Virtual Machine bytecode.

In a 4th exemplary aspect of the present disclosure, which may be used in combination with any one or more of the preceding aspects (e.g., the 1st aspect), the object is a complex object having at least one other object within the at least one field.

In a 5th exemplary aspect of the present disclosure, which may be used in combination with any one or more of the preceding aspects (e.g., the 4th aspect), the serializer is configured to recursively apply the rule set to serialize the at least one other objected within the at least one field.

In a 6th exemplary aspect of the present disclosure, which may be used in combination with any one or more of the preceding aspects (e.g., the 1st aspect), the object is one of a list and an array.

In a 7th exemplary aspect of the present disclosure, which may be used in combination with any one or more of the preceding aspects (e.g., the 1st aspect), the object includes an object class.

In an 8th exemplary aspect of the present disclosure, which may be used in combination with any one or more of the preceding aspects (e.g., the 7th aspect), the rule set requires that the object class has a default constructor and that properties of the object are mutable.

In a 9th exemplary aspect of the present disclosure, which may be used in combination with any one or more of the preceding aspects (e.g., the 8th aspect), the rule set further requires that the serializer uses a getter method and a setter method.

Aspects of the subject matter described herein may be useful alone or in combination with one or more other aspects described herein. In a 10th exemplary aspect of the present disclosure, a method includes receiving an object that includes at least one field, initiating serialization of the object according to a rule set, and writing a first intermediate representation of a new object based on the object. The method also includes writing a second intermediate representation to set the at least one field in the new object, and outputting a serialization of the new object based on the first intermediate representation and the second intermediate representation.

In an 11th exemplary aspect of the present disclosure, which may be used in combination with any one or more of the preceding aspects (e.g., the 10th aspect), the first intermediate representation and the second intermediate representation are generated prior to runtime.

In a 12th exemplary aspect of the present disclosure, which may be used in combination with any one or more of the preceding aspects (e.g., the 11th aspect), the first intermediate representation and the second intermediate representation are generated at build time.

In a 13th exemplary aspect of the present disclosure, which may be used in combination with any one or more of the preceding aspects (e.g., the 10th aspect), the intermediate representation is bytecode.

In a 14th exemplary aspect of the present disclosure, which may be used in combination with any one or more of the preceding aspects (e.g., the 13th aspect), the bytecode is Java Virtual Machine bytecode.

In a 15th exemplary aspect of the present disclosure, which may be used in combination with any one or more of the preceding aspects (e.g., the 10th aspect), the object is a complex object having at least one other object within the at least one field.

In a 16th exemplary aspect of the present disclosure, which may be used in combination with any one or more of the preceding aspects (e.g., the 10th aspect), the object is one of a list and an array.

In a 17th exemplary aspect of the present disclosure, which may be used in combination with any one or more of the preceding aspects (e.g., the 10th aspect), the object includes an object class.

In an 18th exemplary aspect of the present disclosure, which may be used in combination with any one or more of the preceding aspects (e.g., the 17th aspect), the rule set requires that the object class has a default constructor and that properties of the object are mutable.

In a 19th exemplary aspect of the present disclosure, which may be used in combination with any one or more of the preceding aspects (e.g., the 18th aspect), the rule set further requires that the serializer uses a getter method and a setter method.

In a 20th exemplary aspect of the present disclosure, which may be used in combination with any one or more of the preceding aspects (e.g., the 10th aspect), the method further includes recursively applying the rule set to serialize values of the at least one field.

Aspects of the subject matter described herein may be useful alone or in combination with one or more other aspects described herein. In a 21st exemplary aspect of the present disclosure, a system includes a memory, a processor in communication with the memory, a serializer, and a plurality of virtual machines. The serializer is configured to receive an object and serialize the object according to a rule set by writing a bytecode configured to create a new object. The rule set requires that properties of the object are mutable and the rule set defines a default constructor. The serializer is also configured to output the bytecode of the object. The plurality of virtual machines are configured to execute the bytecode output by the serializer to configure runtime services of at least one application.

In a 22nd exemplary aspect of the present disclosure, which may be used in combination with any one or more of the preceding aspects (e.g., the 21st aspect), the bytecode is Java Virtual Machine bytecode.

In a 23rd exemplary aspect of the present disclosure, which may be used in combination with any one or more of the preceding aspects (e.g., the 21st aspect), the object is one of a list and an array.

In a 24th exemplary aspect of the present disclosure, which may be used in combination with any one or more of the preceding aspects (e.g., the 21st aspect), the object includes an object class.

In a 25th exemplary aspect of the present disclosure, which may be used in combination with any one or more of the preceding aspects (e.g., the 24th aspect), the rule set requires that the object class has a default constructor and that properties of the object are mutable.

In a 26th exemplary aspect of the present disclosure, which may be used in combination with any one or more of the preceding aspects (e.g., the 25th aspect), the rule set further requires that the serializer uses a getter method and a setter method.

In a 27th exemplary aspect of the present disclosure, which may be used in combination with any one or more of the preceding aspects (e.g., the 21st aspect), the object is a collection.

In a 28th exemplary aspect of the present disclosure, which may be used in combination with any one or more of the preceding aspects (e.g., the 21st aspect), the object is one of a list and an array.

Aspects of the subject matter described herein may be useful alone or in combination with one or more other aspects described herein. In a 29th exemplary aspect of the present disclosure, a method includes receiving an object and serializing the object according to a rule set by writing a bytecode configured to create a new object. The rule set requires that properties of the object are mutable and the rule set defines a default constructor. The method also includes outputting the bytecode of the object and executing the bytecode output by the serializer to configure runtime services of at least one application.

In a 30th exemplary aspect of the present disclosure, which may be used in combination with any one or more of the preceding aspects (e.g., the 29th aspect), the bytecode is generated prior to runtime.

In a 31st exemplary aspect of the present disclosure, which may be used in combination with any one or more of the preceding aspects (e.g., the 29th aspect), the bytecode is generated at build time.

In a 32nd exemplary aspect of the present disclosure, which may be used in combination with any one or more of the preceding aspects (e.g., the 29th aspect), the bytecode is Java Virtual Machine bytecode.

In a 33rd exemplary aspect of the present disclosure, which may be used in combination with any one or more of the preceding aspects (e.g., the 29th aspect), the rule set further requires that the serializer uses a getter method and a setter method.

In a 34th exemplary aspect of the present disclosure, which may be used in combination with any one or more of the preceding aspects (e.g., the 29th aspect), the object is a collection.

In a 35th exemplary aspect of the present disclosure, which may be used in combination with any one or more of the preceding aspects (e.g., the 29th aspect), the object is one of a list and an array.

Aspects of the subject matter described herein may be useful alone or in combination with one or more other aspects described herein. In a 36th exemplary aspect of the present disclosure, a system includes a means for receiving an object that includes at least one field, a means for initiating serialization of the object according to a rule set, a first means for writing a first intermediate representation of a new object based on the object, and a second means for writing a second intermediate representation to set the at least one field in the new object. The system also includes a means for outputting a serialization of the new object.

Aspects of the subject matter described herein may be useful alone or in combination with one or more other aspects described herein. In a 37th exemplary aspect of the present disclosure, a system includes a means for receiving an object, a means for serializing the object according to a rule set, a means for outputting bytecode of the object, and a means for executing the bytecode output by the serializer to configure runtime services of at least one application.

Aspects of the subject matter described herein may be useful alone or in combination with one or more other aspects described herein. In a 38th exemplary aspect of the present disclosure, a non-transitory machine readable medium stores code, which when executed by a processor, is configured to receive an object that includes at least one field and initiate serialization of the object according to a rule set. The non-transitory machine readable medium is also configured to write a first intermediate representation of a new object based on the object and write a second intermediate representation to set the at least one field in the new object. Additionally, the non-transitory machine readable medium is configured to output a serialization of the new object based on the first intermediate representation and the second intermediate representation.

Aspects of the subject matter described herein may be useful alone or in combination with one or more other aspects described herein. In a 39th exemplary aspect of the present disclosure, a non-transitory machine readable medium stores code, which when executed by a processor, is configured to receive an object and serialize the object according to a rule set by writing a bytecode configured to create a new object. The rule set requires that properties of the object are mutable and the rule set defines a default constructor. The non-transitory machine readable medium is also configured to output bytecode of the object and execute the bytecode output by the serializer to configure runtime services of at least one application.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
a processor in communication with the memory; and
a serializer configured to:
receive an object that includes at least one field,
initiate serialization of the object according to a rule set,
write a first intermediate representation of a new object based on the object,
write a second intermediate representation to set the at least one field in the new object, and
prior to runtime, output a serialization of the new object based on the first intermediate representation and the second intermediate representation.

2. The system of claim 1, wherein the intermediate representation is bytecode.

3. The system of claim 2, wherein the bytecode is Java Virtual Machine bytecode.

4. The system of claim 1, wherein the object is a complex object having at least one other object within the at least one field.

5. The system of claim 4, wherein the serializer is configured to recursively apply the rule set to serialize the at least one other objected within the at least one field.

6. The system of claim 1, wherein the object is one of a list and an array.

7. The system of claim 1, wherein the object includes an object class.

8. The system of claim 7, wherein the rule set requires that the object class has a default constructor and that properties of the object are mutable.

9. The system of claim 8, wherein the rule set further requires that the serializer uses a getter method and a setter method.

10. A method comprising:
receiving an object that includes at least one field;
initiating serialization of the object according to a rule set;
writing a first intermediate representation of a new object based on the object;
writing a second intermediate representation to set the at least one field in the new object; and
prior to runtime, outputting a serialization of the new object based on the first intermediate representation and the second intermediate representation.

11. The method of claim 10, wherein first intermediate representation and the second intermediate representation are generated prior to runtime.

12. The method of claim 11, wherein the first intermediate representation and the second intermediate representation are generated at build time.

13. The method of claim 10, wherein the object is a complex object having at least one other object within the at least one field.

14. The method of claim 10, wherein the object is one of a list and an array.

15. The method of claim 10, wherein the object includes an object class.

16. The method of claim 15, wherein the rule set requires that the object class has a default constructor and that properties of the object are mutable.

17. The method of claim 10, further comprising recursively applying the rule set to serialize values of the at least one field.

18. A method comprising:
receiving an object;
serializing the object according to a rule set by writing a bytecode configured to create a new object, wherein
the rule set requires that properties of the object are mutable, and
the rule set defines a default constructor;
prior to runtime, outputting the bytecode of the object; and
executing the bytecode output by the serializer to configure runtime services of at least one application.

19. The method of claim 18, wherein the object is a collection.

20. The method of claim 18, wherein the object is one of a list and an array.

* * * * *